US012674890B2

(12) United States Patent
Perugini et al.

(10) Patent No.: US 12,674,890 B2
(45) Date of Patent: Jul. 7, 2026

(54) AIMER LOCALIZATION AND TRIANGULATION IN MULTI-SENSOR SCANNER

(71) Applicant: Datalogic IP Tech, S.r.l., Bologna (IT)

(72) Inventors: Luca Perugini, Bologna (IT); Federico Canini, Bologna (IT); Mattia Francesco Moro, Venice (IT); Simone Spolzino, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 890 days.

(21) Appl. No.: 17/118,374

(22) Filed: Dec. 10, 2020

(65) Prior Publication Data

US 2022/0187459 A1 Jun. 16, 2022

(51) Int. Cl.
*G01S 17/42* (2006.01)
*G01S 7/481* (2006.01)
(Continued)

(52) U.S. Cl.
CPC ............ *G01S 17/42* (2013.01); *G01S 7/4817* (2013.01); *G01S 17/58* (2013.01); *G01S 17/86* (2020.01); *G01S 17/89* (2013.01)

(58) Field of Classification Search
CPC ....... G06K 2207/1011; G06K 7/10722; G06K 7/1413; G06K 7/10881; G06K 7/10831; G06K 2007/10524; G06K 7/10851; G06K 2207/1017; G06K 7/10554; G06K 7/10712; G01S 17/42; G01S 7/4817; G01S 17/58;
(Continued)

(56) References Cited

U.S. PATENT DOCUMENTS 5,837,987 A     11/1998  Danielson et al.
8,201,740 B2     6/2012  Vinogradov et al.
(Continued)

FOREIGN PATENT DOCUMENTS

CN          102447914 B  * 11/2015  ............. H04N 9/646
JP          H09211127 A     8/1997
WO    WO-2014174148 A1 * 10/2014  ......... A61F 9/00821

OTHER PUBLICATIONS

Dabrowski et al., "QR Inception: Barcode-in-Barcode Attacks" (Year: 2014).*
(Continued)

*Primary Examiner* — Thien T Mai
(74) *Attorney, Agent, or Firm* — Cozen O'Connor

(57) ABSTRACT

An optical scanner determines ranging to a subject using a localization phase in which a series of image frames is received which collectively contains an aimer spot captured as a reflection off of a surface of the subject. The captured aimer spot is temporally modulated according to a modulation pattern, and the series of image frames is processed to discriminate the aimer spot based on the modulation pattern to determine a probable location of the aimer spot within at least one of the image frames of the series. A triangulation phase follows in which the probable location of the aimer spot is processed to produce the ranging determination. In an optional implementation, an assessment is made whether that probable location of the aimer spot is within a plausible location based on different device-specific positional offsets in image frames captured by different ones of the plurality of image-capture devices.

20 Claims, 10 Drawing Sheets

(51) Int. Cl.

| | |
|---|---|
| *G01S 17/48* | (2006.01) |
| *G01S 17/58* | (2006.01) |
| *G01S 17/86* | (2020.01) |
| *G01S 17/89* | (2020.01) |
| *G06K 7/14* | (2006.01) |

(58) Field of Classification Search

CPC . G01S 17/86; G01S 17/89; G01S 7/14; G01S 17/48

See application file for complete search history.

(56) References Cited

U.S. PATENT DOCUMENTS

| | | | |
|---|---|---|---|
| 8,899,484 B2 | 12/2014 | Trajkovic et al. | |
| 9,185,306 B1 | 11/2015 | Tan et al. | |
| 9,646,188 B1 | 5/2017 | Kuchenbrod et al. | |
| 9,800,749 B1 | 10/2017 | Tan et al. | |
| 10,244,180 B2 | 3/2019 | Tan et al. | |
| 10,268,854 B1 | 4/2019 | Tan et al. | |
| 10,489,623 B1 | 11/2019 | Handshaw et al. | |
| 10,803,272 B1 | 10/2020 | Deshmukh et al. | |
| 11,245,845 B2 | 2/2022 | Giordano et al. | |
| 2002/0043561 A1 | 4/2002 | Tsikos et al. | |
| 2002/0139853 A1 | 10/2002 | Tsikos et al. | |
| 2006/0043191 A1* | 3/2006 | Patel | G06K 7/10801 |
| | | | 235/462.21 |
| 2006/0118635 A1* | 6/2006 | Joseph | G02B 7/08 |
| | | | 235/462.24 |
| 2007/0003105 A1 | 1/2007 | Nakamura et al. | |
| 2007/0181692 A1 | 8/2007 | Barkan et al. | |
| 2009/0057413 A1* | 3/2009 | Vinogradov | G02B 27/20 |
| | | | 235/462.35 |
| 2009/0084851 A1* | 4/2009 | Vinogradov | G06K 7/14 |
| | | | 235/462.21 |
| 2011/0157373 A1 | 6/2011 | Ye et al. | |
| 2015/0144699 A1 | 5/2015 | Sackett et al. | |
| 2017/0280028 A1 | 9/2017 | Tan et al. | |
| 2017/0289451 A1 | 10/2017 | Wittenberg et al. | |
| 2017/0343345 A1* | 11/2017 | Wittenberg | G01C 3/085 |
| 2018/0024974 A1 | 1/2018 | Welinder et al. | |
| 2018/0124299 A1 | 5/2018 | Brook | |
| 2019/0087618 A1 | 3/2019 | Lei et al. | |
| 2019/0182413 A1 | 6/2019 | Tan et al. | |
| 2019/0228195 A1 | 7/2019 | Lozano et al. | |
| 2020/0320259 A1* | 10/2020 | Stagg | H04N 23/63 |

OTHER PUBLICATIONS

Performance of Barcode Scanner using Peak Detection with Interference from LED Lamps (Year: 2015).*

Extended European Search Report issued in European Application No. 21212343.4, Mailed Date: Apr. 19, 2022, 6 pages.

European Search Report, mailed Apr. 11, 2023, for EP 22211301.1, 5 pages.

Non-Final Office Action Issued in U.S. Appl. No. 17/457,786, mailed Apr. 13, 2023, 15 pages.

Notice of Allowance for U.S. Appl. No. 17/457,786, mailed Oct. 4, 2023, 14 pages.

Corrected Written Opinion, dated Jul. 29, 2021, for European Application No. 21157631.9, 2 pages.

Extended European Search Report, dated Jul. 9, 2021, for European Application No. 21157631.9, 5 pages.

Digital Scanner Product Reference Guide, MN-002689-13-EN, Revision A, , 618 Pages, Sep. 2021.

MC9300 Handheld Mobile Computer, Product Spec Sheet, Zebra, ©2019.

* cited by examiner

700

712

714

SELECT NEXT
CANDIDATE AIMER SPOT FOR
CROSS-CHECKING

1002

READ FIRST AND SECOND
IMAGE-CAPTURE DEVICE
COORDINATES

1004

COMPARE FIRST AIMER SPOT
LOCATION AND SECOND AIMER
SPOT LOCATION TO PLAUSIBLE
PAIRS OF VALID LOCATIONS

1006

COMPUTE DISTANCE
BASED ON
COORDINATES

1012

PLAUSIBLE?

1008

Y

N

DISCARD CANDIDATE

1010

AIMER LOCALIZATION AND TRIANGULATION IN MULTI-SENSOR SCANNER

TECHNICAL FIELD

The present disclosure generally relates to automated vision and, more particularly, to capturing and processing of images containing subject matter of interest such as machine-readable symbols or patterns.

BACKGROUND

Image-based optical scanning includes a diverse range of applications such as reading of machine-readable symbols (e.g., one-dimensional symbols, 2-dimensional symbols), optical character recognition, object detection or recognition, and the like. In general, such systems work by capturing a digital image of a subject using a camera with an image sensor, and computationally processing the captured image to autonomously detect, recognize, or read the subject. The output generally includes data represented by, or describing, the subject. For example, in the case of reading a 1-D or 2-D symbol, the output may be a number or an alphanumeric string represented by that symbol. Likewise, in the case of recognizing a printed or hand-written character or set of characters, the output may be a textual representation of that character or set; and in the case of object recognition, the output may be a classification result (e.g., a label) describing the object.

Optical scanners offer the versatility of being able to capture many different types of symbols and at different distances from the reader. State-of-the-art optical scanners use multiple cameras with different fields of view to capture multiple images of the subject, and use image processing techniques to determine the best image for symbol reading. Such scanners may employ autofocus systems that focus the optics of a camera at the correct distance.

Autofocus techniques may be passive or active. Passive autofocus makes a complete focus sweep while evaluating the image contrast and deciding which focus setting produces the greatest contrast and is thus the best one to use. This approach is a type of closed-loop system that is reliable but slow, resulting in unacceptable latency that adversely affects the usability of the scanner device.

Active autofocus techniques can be significantly faster than passive autofocus techniques. Active autofocus uses an auxiliary measurement system that emits a signal which is not part of the image to be captured, and senses a reflection of the emitted signal from the target's surface. These include such technologies as time-of-flight sensors, laser triangulation, phase-shift measurement, and ultrasound measurement, among others. Active autofocus techniques provide some measure (such as turn-around delay, phase shift, or dot-displacement inside the received image, etc.) that can indicate the distance from the scanner to the target. In turn, the measured distance is used to set the correct focus position. Active autofocus systems are open-loop systems that may be fast, but their accuracy reliability is dependent on the performance of the auxiliary measurement system.

One type of challenge faced by active autofocus systems is the presence of interference that can affect the performance of their auxiliary measurement systems. For instance, in auxiliary measurement systems using light-based signal emissions, such as laser spots, other light sources or reflections appearing within the field of view of one or more of the cameras of the scanner device might confuse an auxiliary measurement system into interpreting such interference as a reflection of an emitted signal, or they may prevent reliable reception of the desired emitted-signal reflection from the target surface. Such challenges may be particularly problematic in long-distance scanning applications where the target surface and the symbol to be read constitutes a small fraction of the captured images, and where the captured images contain more of the background scenery, which is of no interest to the scanning operation and presents a greater chance of presenting optical interference to the scanning device.

SUMMARY

According to some aspects of this disclosure, an apparatus of an optical scanner for scanning a subject is provided. The apparatus may include multiple camera systems and an active autofocus system based on laser triangulation that is operative to localize the aimer in the image, convert the aimer position to determine a distance to the target, and use the distance information to focus the image-capture system. Advantageously, techniques presented in this disclosure facilitate accuracy and reliability of the autofocus system using temporal modulation of the laser signal and position matching in the cameras in order to eliminate false-positive aiming-spot detection.

According to one type of embodiment, an apparatus of an optical scanner for scanning a subject includes interface circuitry having an input to receive a plurality of images from at least one image-capture device, and controller circuitry coupled to the interface circuitry and the input. The controller circuitry is operative to perform a ranging determination that includes a localization phase and a triangulation phase. In the localization phase, a series of image frames is received via the input. The series of image frames collectively contains an aimer spot captured as a reflection off of a surface of the subject. The captured aimer spot is temporally modulated according to a modulation pattern. The series of image frames is processed to discriminate the aimer spot based on the modulation pattern to determine a probable location of the aimer spot within at least one of the image frames of the series. In the triangulation phase, the probable location of the aimer spot is processed to produce the ranging determination, wherein the ranging determination represents a distance between the at least one image-capture device and the surface of the subject.

In another embodiment, an apparatus of an optical scanner for scanning a subject includes interface circuitry including an input to receive a plurality of images from a plurality of image-capture devices, and controller circuitry coupled to the interface circuitry and the input, the controller circuitry operative to perform a ranging determination, which includes a localization phase and a triangulation phase. Each image of the plurality of images from each of the plurality of image-capture devices has a device-specific positional offset of the captured aimer spot that varies based on a distance between a respective image-capture device and the surface of the subject, and further based on a relative position of that respective image-capture device and a projector of the aimer spot. The localization phase identifies a probable location of the aimer spot within the captured image frames. In the triangulation phase the probable location of the aimer spot is processed to assess whether that probable location of the aimer spot is within a plausible location based on different device-specific positional offsets in image frames captured by different ones of the plurality of image-capture devices. The ranging determination may represent a distance between the optical scanner and the surface of the subject.

DETAILED DESCRIPTION

Figure 1:
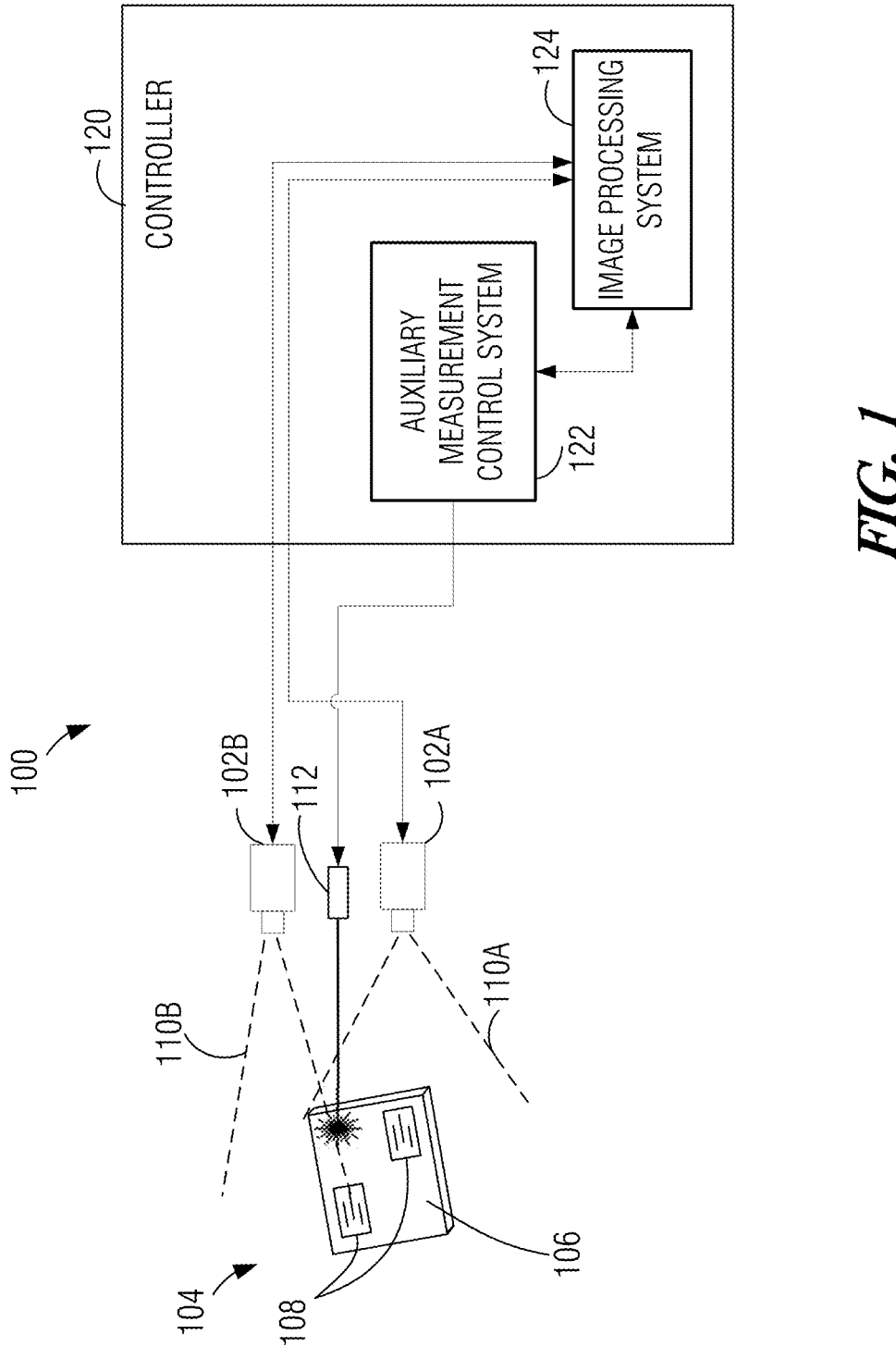
FIG. 1 is a simplified block diagram illustrating an implementation of a scanning system according to at least one example embodiment.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

Some aspects of the present disclosure provide an image-based optical scanning system having multiple image-capture devices. FIG. 1 is a simplified block diagram illustrating an implementation of a scanning system 100, according to at least one example. As discussed further below, the scanning system 100 may be employed to capture multiple images of a subject 104, such as a machine-readable symbol or set of symbols 108 (e.g., barcode, 2D barcode, image-encoded information such as a digital watermark, printed characters or text), or a machine-detectable or -recognizable object 106. Scanning system 100 may read, recognize, detect, or perform other automated analytical processing of the subject. For the sake of brevity, operations such as these will be referred to in the present context as "reading."

Aspects of the disclosure may likewise be used in other areas of automated vision, such as automated guided vehicles (AGVs), robotics, automated driving, and machine-vision (MV) systems. The embodiments described below are in the context of visual symbol-reading, but principles of the present technologies relating to localization or ranging are likewise applicable in a multitude of other areas.

Scanning system 100 includes multiple image-capture devices, 102A-102B (collectively, image-capture devices 102). In this example, two image-capture devices 102A, 102B are shown for clarity; however, it will be understood that additional image-capture devices may be employed. Each image-capture device 102 may include an image sensor that is constructed and operative to produce signals representing images or video frames. In the present context, the terms "image" and "video frame" may be used interchangeably to refer to a fixed image or portion thereof, with any distinctions intended between the two data types specifically called out if pertinent.

Each image-capture device 102 may be assembled together with optical components, such as an objective, microlens array, or the like. In other examples, more than one individual image-capture device may share a common optical system. Image-capture devices 102A-102B may be constructed using any suitable technology, whether known or arising in the future. Without limitation, some examples include complementary metal-oxide semiconductor (CMOS)-based sensors, charge-coupled device (CCD)-based sensors, sensors optimized for the visible spectrum, sensors optimized for infrared or near-infrared frequencies, high-dynamic-range (HDR) sensors, monochrome sensors, color sensors, Quanta Image Sensors, Hyperspectral sensors, Polarized sensors, Image sensors embedding AI capabilities, or the like. In related implementations, the set of image-capture devices 102 that are employed in scanning system 100 include sensors of diverse types, such as a grouping that includes conventional image sensor and a HDR image sensor, for example.

As shown in the example of FIG. 1, image-capture devices 102A-102B have respective fields of view 110A-110B. In related examples, the various image-capture devices 102 have different optical characteristics. For instance, image-capture device 102A may be a near-field camera, whereas image-capture device 102B may be a far-field camera. In other examples, the image-capture devices 102 have the same optical characteristics. As another useful feature in some embodiments, the image-capture devices 102 are situated in a specific spaced relationship with one another.

Scanning system 100 further includes aimer projector 112, which may be a laser emitter as depicted. Aimer projector 112 is situated at a fixed position relative to image-capture devices 102A-102B. As will be discussed in greater detail below, in some embodiments, the positional offset between each image-capture device 102 and aimer projector 112 facilitates determination of ranging to the target surface using a triangulation technique.

Image-capture devices 102 and aimer projector 112 are interfaced with controller 120, which includes auxiliary measurement control system circuitry 122 and image processing system circuitry 124. In some embodiments, each image-capture device 102 and aimer projector 112 may be communicatively coupled to controller 120 through a wired or wireless medium. In a related embodiment, a network (e.g., LAN, WAN, PAN, Internet) may facilitate the communicative coupling. In some embodiments, the image-capture device 102 may be connected directly to controller 120 through a suitable local interface (e.g., I²C, USB, SPI, UART, I³C) or may be integrated with controller 120 and interconnected using an internal interconnect such as a suitable variant of a peripheral component interconnect (PCI), serial AT Attachment (SATA), mobile industry processor interface (MIPI), or other interconnects known by those skilled in the art.

Auxiliary measurement control system 122 is operative in concert with image processing system 124 to coordinate the operation of aimer projector 112 and image-capture devices 102A-102B to measure the ranging to a target surface of subject 104. Image-capture devices 102 are communicatively coupled to image processing system 124, which is configured to receive the captured images and perform the processing operations for determining the ranging, setting operational parameters to facilitate image capture of subject 104 based on the ranging, and capture the images of subject 104 to perform reading of subject 104.

For determining the ranging, image processing system 124 is coupled to auxiliary measurement control system 122 so that the two may exchange relevant data and commands. For instance, image sensor frame capture signaling may be supplied by image processing system 124 to auxiliary measurement control system 122, so that the latter may adjust the activation of the laser spot within frames of the captured images.

Figure 2:
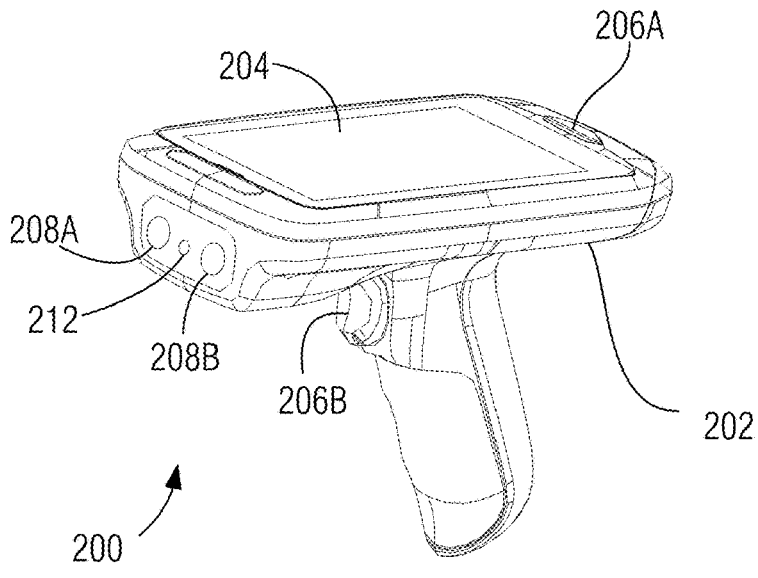
FIG. 2 is a diagram illustrating handheld reader as one example implementation of a scanning system.

FIG. 2 is a diagram illustrating handheld reader 200 as one example implementation of scanning system 100. Handheld reader 200 includes housing 202, display 204, and pushbutton controls 206A and 206B. As depicted, handheld reader 200 also includes forward-facing cameras 208A and 208B positioned in a spaced-apart relationship so as to have partially overlapping fields of view. A forward-facing laser emitter 212 is provided to facilitate ranging to the subject. Laser emitter 212 may work in concert with one or all of the cameras 208A, 208B according to a triangulation technique in which a position of the laser spot within the field of view of one or both of the cameras is indicative of the distance to the subject. The ranging measurements may be used as input (among other inputs) to determine operational parameters such as selection of image sensor for subsequent information processing, focus setting, illumination power, and other settings.

According to other embodiments, a reader may be mounted to a stationary or mobile structure. Examples of mounting locations for various scanning applications include vehicles, doorways, ramps, conveyors, buildings, robots, or the like. In mounted implementations, the cameras may have their own respective housings, which may be separate from the image processing system hardware.

Figure 3:
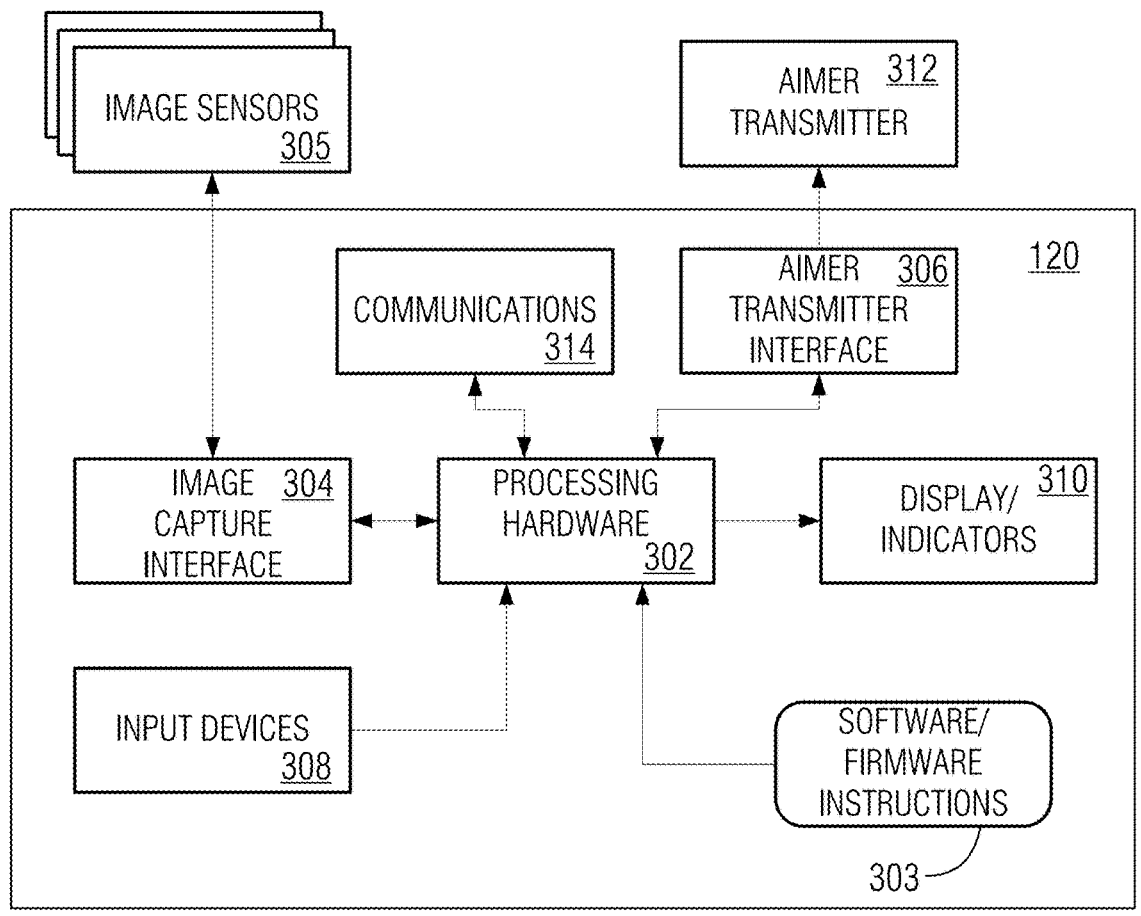
FIG. 3 is a high-level block diagram illustrating an example system architecture of a scanning system 100 according to some embodiments.

FIG. 3 is a high-level block diagram illustrating an example system architecture of scanning system 100, with various components of controller 120 shown. Controller 120 includes processing hardware 302 operatively coupled to image capture interface 304, input devices 308, display or indicators 310, communications circuitry 314, and aimer projector interface 316. Processing hardware 302 includes one or more processor circuits that execute software or firmware instructions 303, with the latter being stored in a non-transitory machine-readable medium such as a read-only memory, flash memory, random-access memory, or the like.

Controller 120 includes various engines, each of which is configured to carry out a function or set of functions, as detailed below. The term "engine" as used herein means a tangible device, component, or arrangement of components implemented using hardware, such as by an application specific integrated circuit (ASIC) or field-programmable gate array (FPGA), Complex Programmable Logic Device (CPLD), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s)

of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Image capture interface 304 includes circuitry facilitating the exchange of data between processing hardware 302 and image sensors 305. In some examples, image capture interface 304 includes data buffers, video decoders, video encoders, address and data bus interfaces, serial data receiver/transmitter circuitry, analog-to-digital (A/D) converter circuitry, and the like. The data communications portions of image capture interface 304 may facilitate wired or wireless communication. Image capture interface 304 is operative to pass video frames from their original format as output by each of image sensors 305 to processing hardware 302 in a suitable data format to be read by processing hardware 302. Image capture interface 304 and processing hardware 302 may work in concert to implement image processing system 124 (FIG. 1).

In a related example, image capture interface 304 may additionally be configured to pass information from processing hardware 302 to one or more of image sensors 305. This upstream information may include configuration commands such as sensor gain settings, frame rate, exposure control, activation/deactivation commands, etc.

In some embodiments, image capture interface 304 may be integrated as part of a digital signal processor (DSP) device or microcontroller device. In other embodiments, image capture interface 304 may be integrated as part of one or more image sensors 305.

Aimer projector interface 306 includes circuitry to control the operation of aimer projector 312. Aimer interface 306 may include current regulator circuitry, switching circuitry, or the like. Aimer projector 312 may include a solid-state laser emitter having a wavelength that is within the light-detection range of image sensors 305. Aimer projector interface 306, and processing hardware 302 may work in concert to implement auxiliary measurement control system 122 (FIG. 1).

Input devices 308 include user-operable controls, such as pushbuttons, keypad, touchscreen, and the like, as well as additional sensors, such as a ranging sensor, motion sensor, accelerometer, etc. Display or indicators 310 include devices such as a liquid-crystal display (LCD), LED indicators, speaker or buzzer, and other suitable output devices.

Communications circuitry 314 includes wired or wireless communications facilities that provide input and output to and from processing hardware 302. Communication circuitry may include one or more of the following types of communication circuits: universal serial bus (USB), CAN, I²C, SPI, UART, I³C, Ethernet, personal-area network such as Bluetooth according to an IEEE 802.15 standard, Wi-Fi according to an IEEE 802.11 standard, or the like.

Figure 4B:
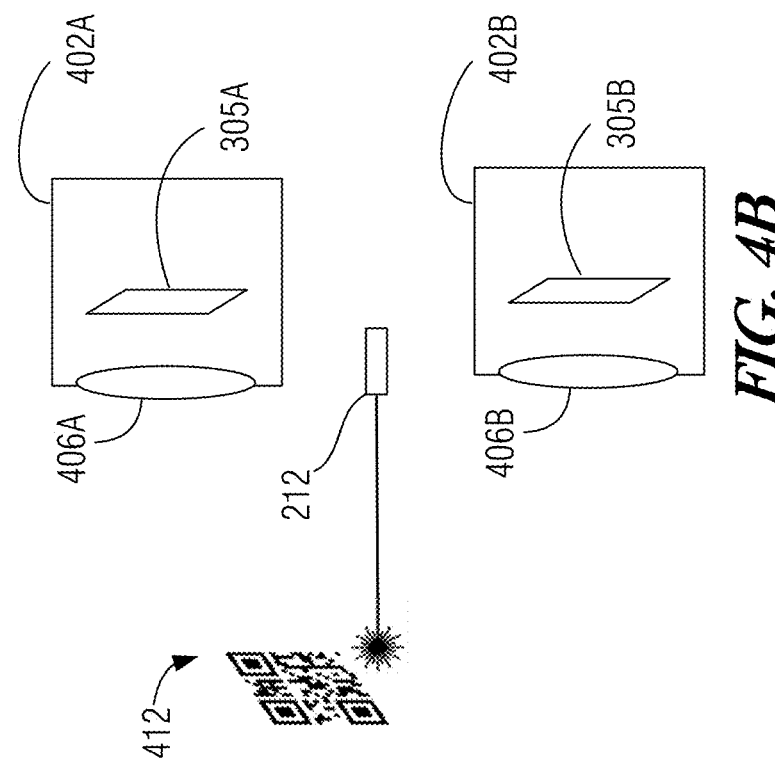
FIGS. 4A-4B are simplified schematic diagrams that illustrate arrangements that may be employed as examples of one or more image-capture devices.
Figure 4A:
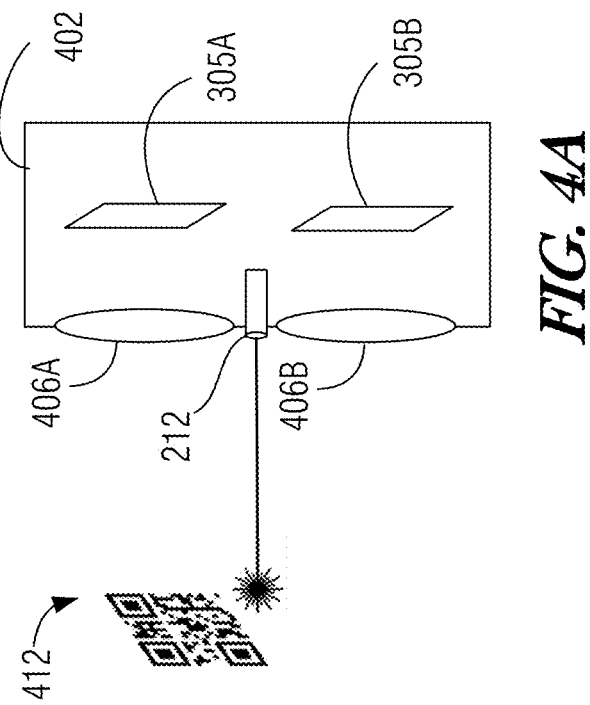

FIGS. 4A-4B are simplified schematic diagrams that illustrate arrangements that may be employed as examples of one or more image-capture devices such as image-capture devices 102. FIG. 4A illustrates an example arrangement consistent with handheld reader 200 described above with reference to FIG. 2. A single enclosure 402 houses image sensors 305A and 305B, each arranged with a corresponding objective 406A and 406B. Laser emitter 212 is also shown. As described above, laser emitter 212 may be used to place a spot on a surface containing subject 412, and video frames captured by image sensors 305A and 305B may be evaluated to determine the ranging to subject 412. FIG. 4B illustrates an example with separate enclosures, 402A and 402B, each having a corresponding image sensor 305A, 305B and objective 406A, 406B. Laser emitter 212 may be situated independently from either enclosure 402A or 402B, or it may be situated in one of the enclosures 402A or 402B.

Figure 5:
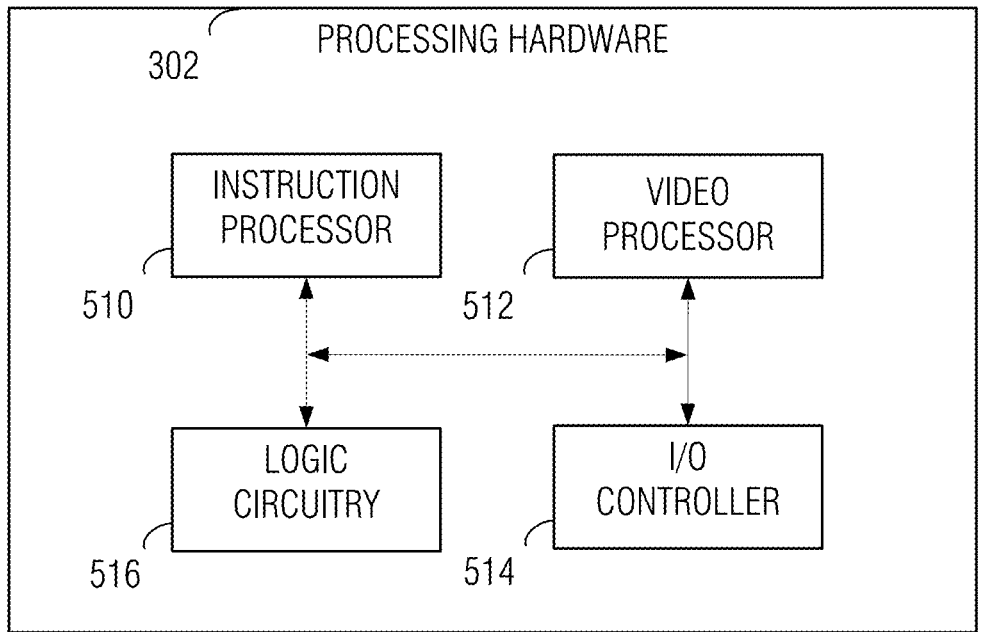
FIG. 5 is a simplified block diagram illustrating a portion of processing hardware of a controller 120 according to one example.

FIG. 5 is a simplified block diagram illustrating a portion of processing hardware 302 of controller 120 according to one example. Processing hardware 302 includes instruction processor 510, video processor 512, and input/output (I/O) controller 514. Instruction processor 510 is constructed to execute software or firmware instructions 303, the execution of which causes instruction processor 510 to implement engines to carry out the overall functionality of scanning system 100 in conjunction with the other components of controller 120, image sensors 305, and aimer projector 312 as shown in FIG. 3. For instance, instruction processor 510 may reads input devices 308 and take actions in response to those inputs; instruction processor 510 may write output to display or indicators 310; and instruction processor 510 may exchange data with communications circuitry 314 to send and receive data to or from other devices. In addition, instructions 303, when executed by instruction processor 510, may causes instruction processor 510 to carry out localization and triangulation operations to determine ranging to the subject as described in greater detail below in accordance with some embodiments.

Instruction processor 510 may be of any suitable architecture. As an example, instruction processor 510 may include a central processing unit (CPU) core, RAM, non-volatile memory, memory controllers, address and data (or shared) busses, serial communications ports such a universal synchronous receiver/transmitter (UART), and peripheral circuitry such as timers, event counters, A/D or D/A converters, pulse-width modulation (PWM) generator, etc.

Video processor 512 is interfaced with instruction processor 510, and implements engines to receive captured images from image-capture devices 102, and to resample, crop, compress, or combine portions of images, filter, evaluate visual characteristics of the captured images, determine the location of captured visual elements within the image frame (such as the location of the laser spot produced by laser emitter 212), and perform symbol reading or object detection algorithms. In some embodiments, video processor 512 includes a digital signal processor (DSP) core having a computing architecture that is optimized for video processing and including additional or specialized arithmetic logic units (ALUs), direct-memory access, fixed-point arithmetic, etc., ASIC, FPGA, CPLD, or combination thereof.

I/O controller 514 includes circuitry that facilitates addressing, data transfer, memory access, and other interactions between instruction processor 510, video processor 512, and the other components of controller 120. As examples, I/O controller 514 may include a bus or system interconnect controller, a serial communications hub controller, or the like.

In related embodiments, instruction processor 510 and video processor 512 are integrated as a single processing device, such as a digital signal controller (DSC) that is configured to perform the respective functionality of instruction processor 510 and video processor 512 described above. Similarly, I/O controller 514 may also be integrated as part of a DSC implementation. In other related embodiments, some portion of processing hardware 302 may be implemented with logic circuitry 516, such as an application-specific integrated circuit (ASIC), FPGA, CPLD, hardware coprocessor, or the like. Logic circuitry 516 may be utilized to perform certain operations with greater speed or power efficiency than can be conventionally achieved using an instruction processor, such as image filtering, image frame combining, localization, or the like.

Figure 6:
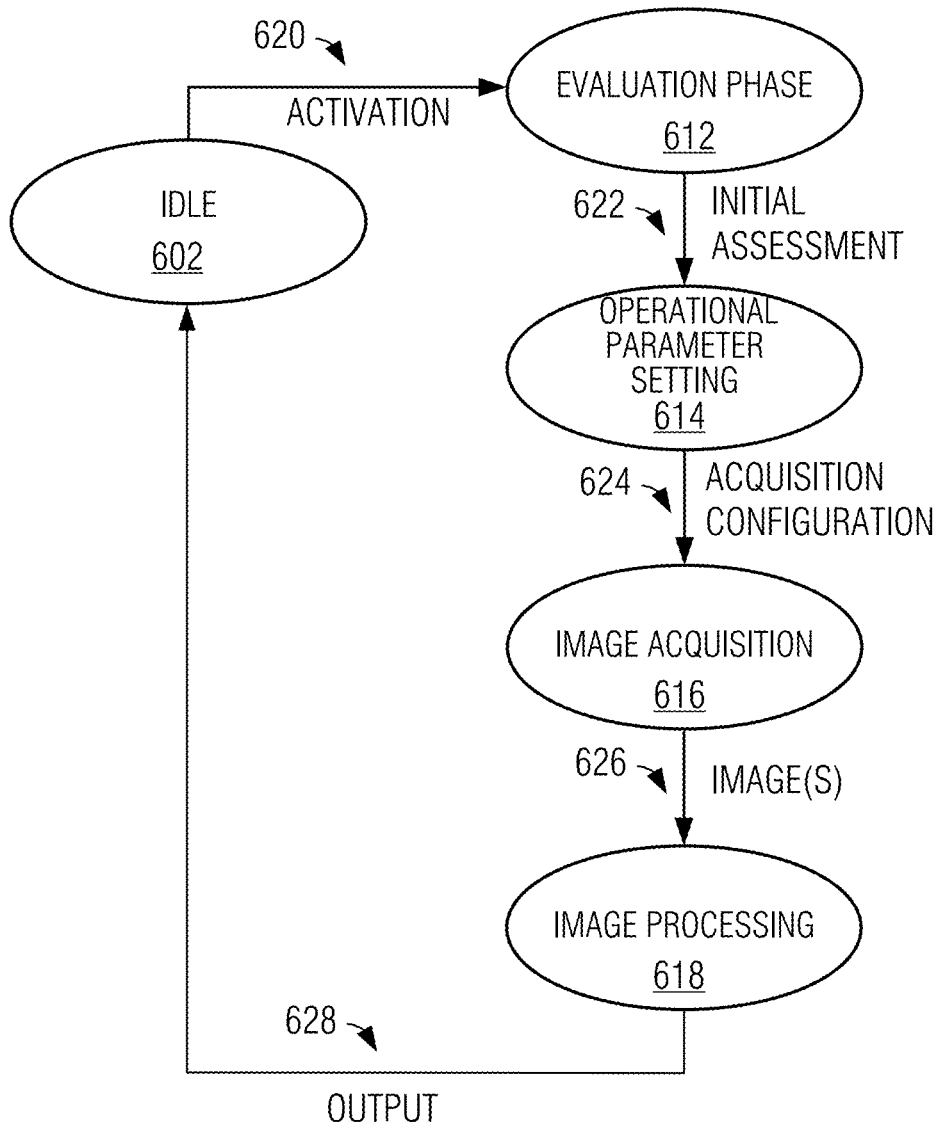
FIG. 6 is a high-level state diagram illustrating a simplified operational regime of a controller of a scanning system according to an example embodiment.

FIG. 6 is a high-level state diagram illustrating a simplified operational regime of controller 120 according to an example embodiment. The states include idle 602, evaluation phase 612, operational parameter setting 614, image acquisition 616, and image processing 618. Evaluation phase 612 is started in response to an activation event 620. In the example of a hand-triggered reader such as handheld reader 200, the activation event may be actuation of a pushbutton.

Evaluation phase 612 involves rapidly performing one or more initial measurements, such as a distance measurement, lighting conditions measurement, or other such measurement, in order to determine the mode of operation for image acquisition. In the case of distance measurement, the ranging to the subject may be determined using aimer projector 112 and auxiliary measurement control system 122 to produce a ranging measurement as part of initial assessment data 622. In some embodiments, the speed of evaluation phase 612 is maximized to provide minimal operational latency. As an example, evaluation phase 612 may be performed using a subset of the image frames in order to reduce the extent of image processing required to achieve initial assessment 622.

Operational parameter setting 614 uses the initial assessment data 622 to set operational parameters such as selection of camera or image sensor, focus setting, exposure setting, image-sensor gain setting, active illumination (e.g., flash or light) setting, active illumination source selection (in embodiments utilizing multiple active illumination sources), or the like. Operational parameter setting 614 produces acquisition configuration data 624, which may include a command set the focus, activate a flash or light, select of a region of interest (ROI), or any combination of these and other available settings. Image acquisition 616 involves activating the selected image sensor according to the applicable operational parameters to capture one or a series of images 626. For example, the best image sensor may be selected, along with various settings for that image sensor, such as gain, exposure, etc.

Image processing 618 are generally performed on one or more captured images 626 resulting from operation of acquisition phase 616. Image processing operations 618 include reading of the subject (e.g., symbol reading, text recognition, object detection, object recognition, etc.). Image processing 618 is a more computationally-expensive process than the initial assessment operations that are performed as part of evaluation phase 612 image acquisition phase 616. The result of image processing 618 is output 628, which may be in the form of a data object indicating the data of a machine-readable symbol, recognized text or object, etc.

Figure 7:
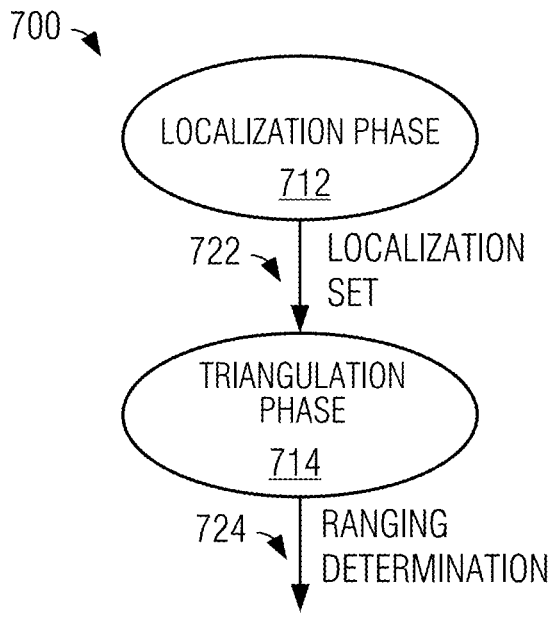
FIG. 7 is a state diagram illustrating autofocus operation according to some embodiments.

FIG. 7 is a state diagram illustrating autofocus operation 700, which may be considered a part of evaluation phase 612 according to some embodiments. Autofocus operation 700 includes localization phase 712 and triangulation phase 714. Localization phase 712 and triangulation phase 714 are each carried out by auxiliary measurement control system 122, which uses aimer projector 112 (such as laser emitter 212) and image processing system 124. In particular, aimer projector 112 may place a laser spot on a target surface of the subject. The aimer spot is sensed by the image sensor of each image capture device 102A, 102B, and the resulting images are processed rapidly to determine the ranging. Localization phase 712 determines a localization set 722 of possible coordinates of the aimer spot appearing in the images captured by each image capture device 102A, 102B. Using the localization set 722, the triangulation phase 714 makes a ranging determination. As described in greater detail below, one aspect of localization phase 712 includes modulation of the aimer spot, which helps controller 120 distinguish the aimer spot from interference, such as other sources of light, which may be present in the captured images. One aspect of triangulation phase 714 is a cross-checking operation that determines whether the locations of the aimer spot within the images, as captured by different image capture devices 102A, 102B, are plausible considering that the positional offsets of each type of image-capture device for various distances to the target surface are known in advance. Thus, the cross-checking operation may further help to improve the accuracy and computational performance of the ranging determination by discarding erroneous aimer spot locations.

Figure 8:
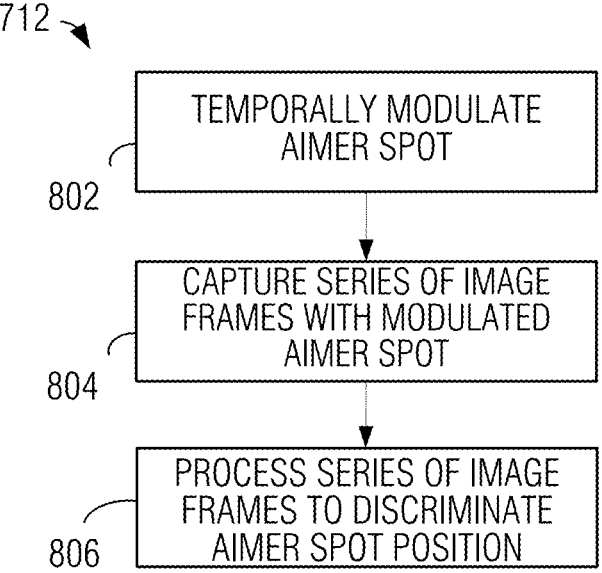
FIG. 8 is a process flow diagram illustrating an example sequence of operations corresponding to a localization phase of an autofocus operation according to some embodiments.

FIG. 8 is a process flow diagram illustrating an example sequence of operations corresponding to localization phase 712 according to some embodiments. At 802, aimer projector 112 is operated under the control of auxiliary measurement control system 122 such that the aimer spot as seen by image-capture devices 102A and 102B is temporally modulated. In the present context, temporal modulation of the aimer spot means that the aimer spot is varied over time such that the aimer spot's appearance differs among captured image frames. One or more of a variety of types of temporal modulation may be used, whether individually, or in a combination. Some examples of types of temporal modulation are described herein, but these examples does not constitute a complete or exhaustive set of temporal modulation types that may be used in various embodiments.

At 804, image capture devices 102A and 102B are operated by auxiliary measurement control system 122 working in concert with image processing system 124 to each capture a series of image frames with the aimer spot. Each image sensor's captured series of image frames, when viewed or analyzed in sequence, has the modulation pattern of the captured aimer spot. In related embodiments, the frame rate of each of the image-capture devices 102, relative to the rate of modulation of the capturable aimer spot is such that the modulation pattern is discernable from random visible noise or from other patterns of change that may be appearing in the series of image frames, such as a flickering light or reflection, for instance. At 806, auxiliary measurement control system processes each sensor's series of image frames, based on the captured aimer spot's modulation pattern, to discriminate the position of the aimer spot from other sources of light or reflection that may have also been captured in the series of image frames.

Modulation of the aimer spot of operation 802 may be achieved in a number of ways according to various embodiments. In one type of embodiment, the aimer projector may be switched on and off according to a particular pattern. The switching pattern may be at a particular frequency. In addition, the switching pattern may have a particular duty cycle, (i.e., on for a specific first duration and off for a specific second duration). The switching pattern may be encoded using on-off keying, frequency-shift keying, pulse-position modulation, phase shift keying, or other digital encoding technique that facilitates carrying of information by the modulation of the carrier spot. The information that may be encoded includes a numeric value, for instance.

In a related embodiment, the intensity of the aimer projector may be varied. Accordingly, the aimer spot may appear brighter or darker in successive images, and the variation of intensity may be implemented with a certain pattern. Likewise, an amplitude-shift keying, phase-shift technique, frequency-shift keying, or other encoding technique may be utilized with the varying intensity modulation.

Figure 9A:
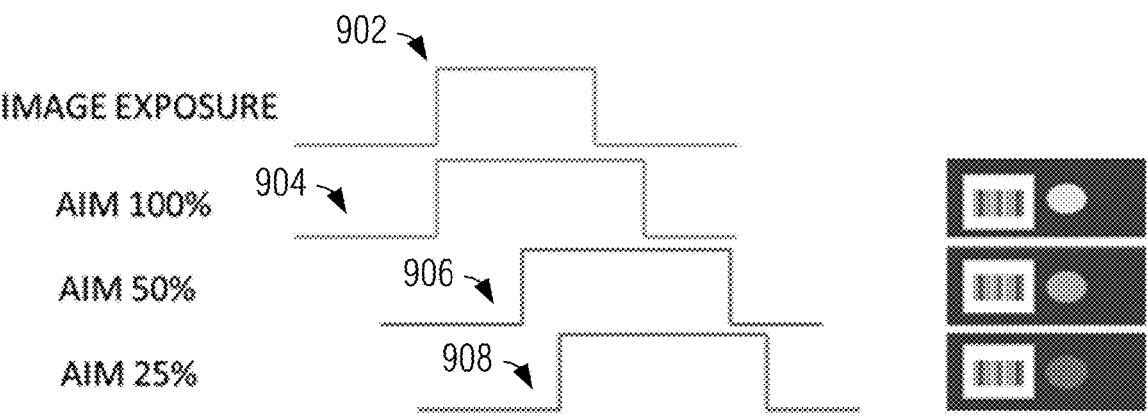
FIG. 9A is a diagram illustrating a technique of intensity variation of an aimer spot according to some embodiments.

In a related embodiment, the intensity of the captured aimer spot may be modulated by controlling the timing of the aimer transmission relative to the image-frame capture timing. FIG. 9A is a diagram illustrating an example of this type of embodiment. The image capture timing is indicated as image exposure 902, and various aimer activations are indicated at 904-906. Aimer activation 904 is on for the entire duration of image exposure 902 to produce a full-intensity captured aimer spot. Aimer activation 906 is on for half of the image exposure 902 duration to produce 50% captured intensity as shown. Aimer activation 908 is on for one quarter of the image exposure 902 to produce a captured aimer spot intensity of 25% as shown. The percentages given in this example, are merely illustrative. Various other ratios of activation duration of the aimer projector may be used in various embodiments. This method of aimer spot intensity variation may likewise be used to encode information on the captured aimer spot.

Figure 9B:
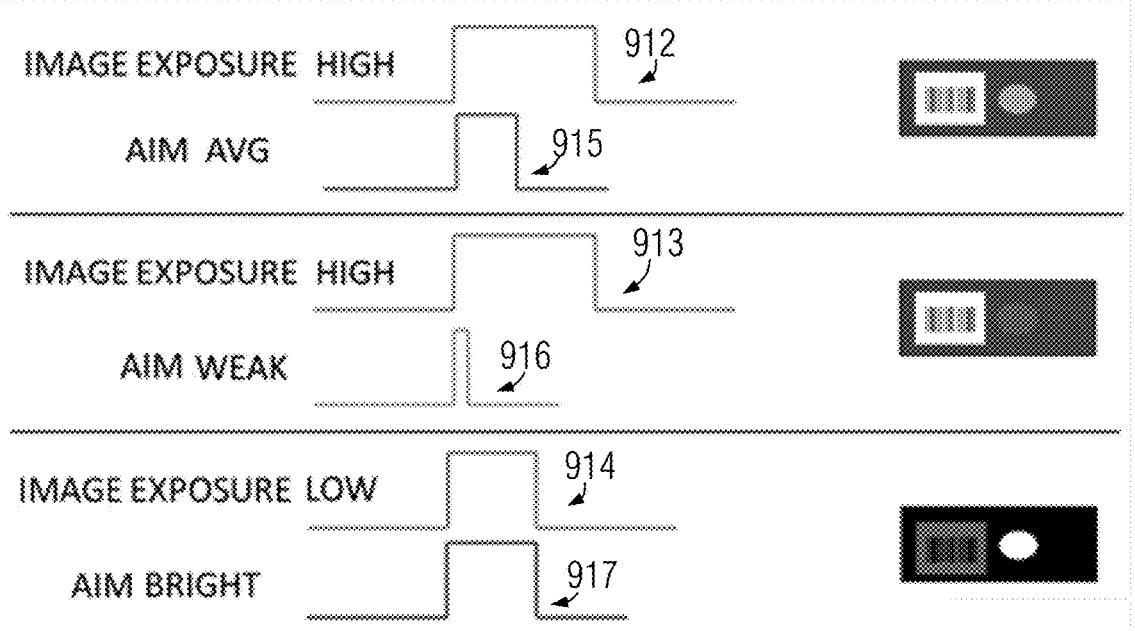
FIG. 9B is a diagram illustrating image-exposure and aimer-spot timings as an example of another type of embodiment in which the captured aimer spot may be modulated by controlling the pulse duration of the aimer transmission during the image-frame capture timing while the frame exposure time may be varied.

In a related embodiment, the intensity of the captured aimer spot may be modulated by controlling the pulse duration of the aimer transmission during the image-frame capture timing while the frame exposure time may be varied. This approach provides different overall brightness levels in the acquired images, which may facilitate the process of distinguishing the aimer spot from other light sources in the field of view. FIG. 9B is a diagram illustrating image-exposure and aimer-spot timings as an example of such an implementation. The capture timing of the three images is indicated as image exposure timings 912, 913, and 914. The varying aimer activation timings are indicated at 915-917.

In first frame, the image exposure 912 is of a relatively long duration, while the aimer activation 915 is a pulse of an intermediate duration falling within the duration of image exposure 912. This produces an intermediate-intensity captured aimer spot. In second frame, the image exposure 913 is of a relatively long duration, while the aimer activation 916 is a pulse of short duration falling within the image exposure 913. This produces a lower intensity of captured aimer spot while having the same ambient light exposure, in the case of the first frame. In the third frame, the image exposure 914 is reduced relative to image exposures 912 and 913, while the aimer activation 917 has a long pulse duration during image exposure 914. This combination produces a high captured aimer spot intensity, while having less undesired ambient light acquired by the sensor.

The technique as illustrated in FIG. 9B allows the aimer spot to be more easily isolated from any reflected light sources because the ambient light is following a partially opposite brightness modulation with respect to the aimer: namely, the aimer brightness becomes weaker as between exposures 912 and 913, while the overall brightness is the same so to detect the modulation that should come only from aim spot. Then, from image exposures 913 to 914 the aimer spot is brighter when ambient image as captured is darker, so to enhance the aimer spot detection. Thus, it becomes easier to distinguish the aimer spot from any noise originating from ambient light. This technique of aimer spot intensity variation may likewise be used to encode information on the captured aimer spot.

The above-described modulation techniques may be used in any suitable combination. For example, on-off keying may be combined with aimer received intensity variation using image capture frame timing so that a certain pattern of on-off switched aimer spots may be captured at one intensity level, and another pattern of on-off switched aimer spots may be captured at another intensity level. In addition to the above-described modulation techniques, other modulation techniques may likewise be used (individually, or in some combination with others).

In another type embodiment, the exposure time or sensor gain may be varied to correspondingly vary the signal-to-noise ratio of the captured aimer spot (i.e., the signal) to other light sources (i.e., the noise) appearing in the captured series of image frames. This technique may be used in combination with any of the modulation techniques discussed above.

Processing of the series of image frames to discriminate the aimer spot position in operation 806 may be performed in a variety of ways according to various embodiments. In one example, successive image frames in which the aimer spot is varied from frame to frame may be processed such that the pixel values of one frame are subtracted from the next, resulting in a difference frame representing a difference between the corresponding pixel values among the compared image frames. In the difference frame, the modulated aimer spot may appear as the greatest difference value.

A more advanced approach when using exposure and aimer modulation as described above with reference to FIG. 9B according to some embodiments involves comparing the first image with the second image to see if the difference in pixel value corresponds with the aimer-spot modulation. For example if pixel intensity in first image is higher than the corresponding pixel value in the second image multiplied by 1.5 for instance, then that pixel may be stored with a value of 0 in a "non-aimer pixels" synthetic image generated during a first processing step; then, similarly, if the third image has a pixel value higher than the corresponding second image pixel value multiplied by 2 for instance, that pixel may be also stored with a value of 0 in the "non-aimer pixel" synthetic image in this second processing step. If the third image has a pixel value that is lower than the "non-aimer pixels" image, than that pixel may be stored as zero in an "enhanced contrast aimer pixels" reference image generated in this processing step; otherwise it may be stored as a difference between the third image's pixel and the "non-aimer pixels" synthetic image.

In this example, since the third frame is the one with the lowest exposure (hence, ideally with lowest overall pixel value except for the pixels where the aimer spot is projected), the "enhanced contrast aimer pixels" image will have the undesired pixels (where presumably there is no aimer spot) with a value of 0 and the desired pixels (where presumably there is an aimer spot) with the pixel value of the third image. At this point it may be easier to detect the most probable aimer-spot pixels since they will be the ones with the greatest pixel values in this "enhanced-contrast aimer pixels" image, and they can be compared with a threshold based on the maximum pixel value of this latter image. With the type of processing as described in this example, there is a balanced approach between the ideal and the realistic operational cases, and a good performance may be achieved in terms of aimer spot detection (with few false positives and few false negatives) despite all the non-idealities that might affect the detection in most of the operational cases (e.g., lighting noise, laser speckle, target movement in the field of view).

In related embodiments, more advanced techniques may be applied that compare candidate aimer spot locations in successive difference frames (in which actual the aimer spot is expected to vary in accordance with a known modulation pattern or encoded value) against a reference signal representing that known modulation pattern of encoded value, and discarding candidate aimer spot locations that fail to correspond with the known modulation pattern.

In other related embodiments, a filtering operation may be performed, such as thresholding on the difference frames in order to produce a set of candidate aimer spot locations in which the differences from frame to frame that are in excess of a threshold are present, and all other difference values that do not meet the difference threshold are excluded from the set of candidate aimer spot locations. The threshold may be predefined, or it may be dynamically set based on a defined set of criteria. For example, threshold-setting criteria may be based on the average dynamic range in a captured image frame (e.g., 70% of the dynamic range). Other thresholding may include windowing (i.e., setting an upper and a lower boundary), and excluding difference values that fall outside of the defined range. The windowing boundaries may be varied based on the dynamic range, and also based on the aimer spot modulation pattern.

In other embodiments, additional filtering, such as noise reduction or motion effect filtering (e.g., erosion, dilation, blur), etc., may be used in conjunction with the image-processing operations of image processing 806.

In one type of embodiment, image-processing operation 806 may include combining the captured image frames at each capture point from the multiple image sensors to produce a single series of frames for processing.

The output of localization phase 712, localization set 722, may include a set of coordinates of candidate aimer spot locations. In a related embodiment, localization set 722 may also include spot size for each candidate aimer spot location. For example, each candidate aimer spot may be defined by its (x,y) position and spot size (e.g., spot width in pixels).

Figure 10:
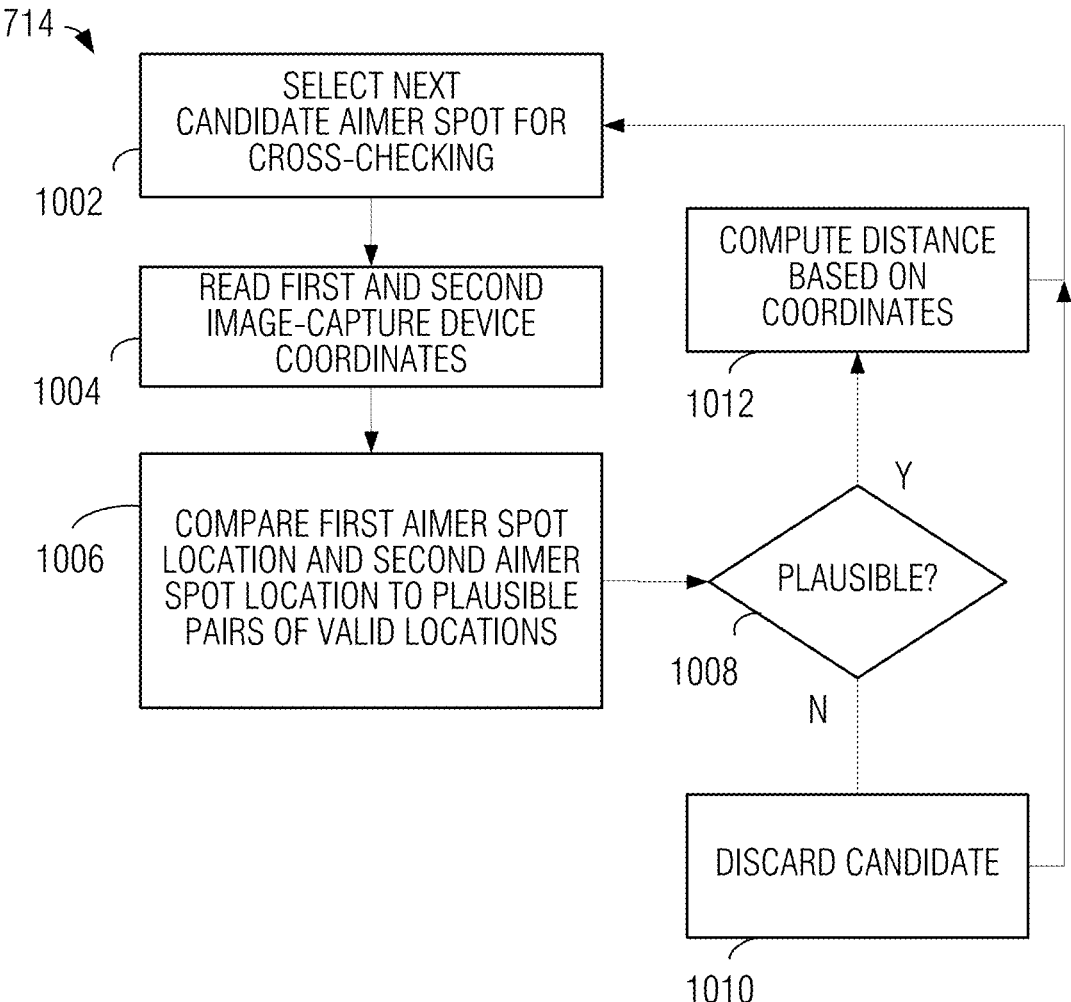
FIG. 10 is a flow diagram illustrating some of the operations of a triangulation phase according to some embodiments.

FIG. 10 is a flow diagram illustrating some of the operations of triangulation phase 714 according to some embodiments. The operation includes cross-checking at each candidate aimer spot to determine if that candidate aimer spot is plausible. Accordingly, at 1002 the next candidate aimer spot from the set of candidates, as read from the output of localization phase 712, is selected. At 1004, the aimer spot coordinates of the selected candidate aimer spot as captured from each image-capture device 102, are read. Each image-capture device 102 is positioned at a different mechanical offset from the aimer projector 112; in addition, in some embodiments the different image capture devices have different fields of view. Accordingly, the position of the aimer spot, as captured by the different image-capture devices is different.

Figure 11:
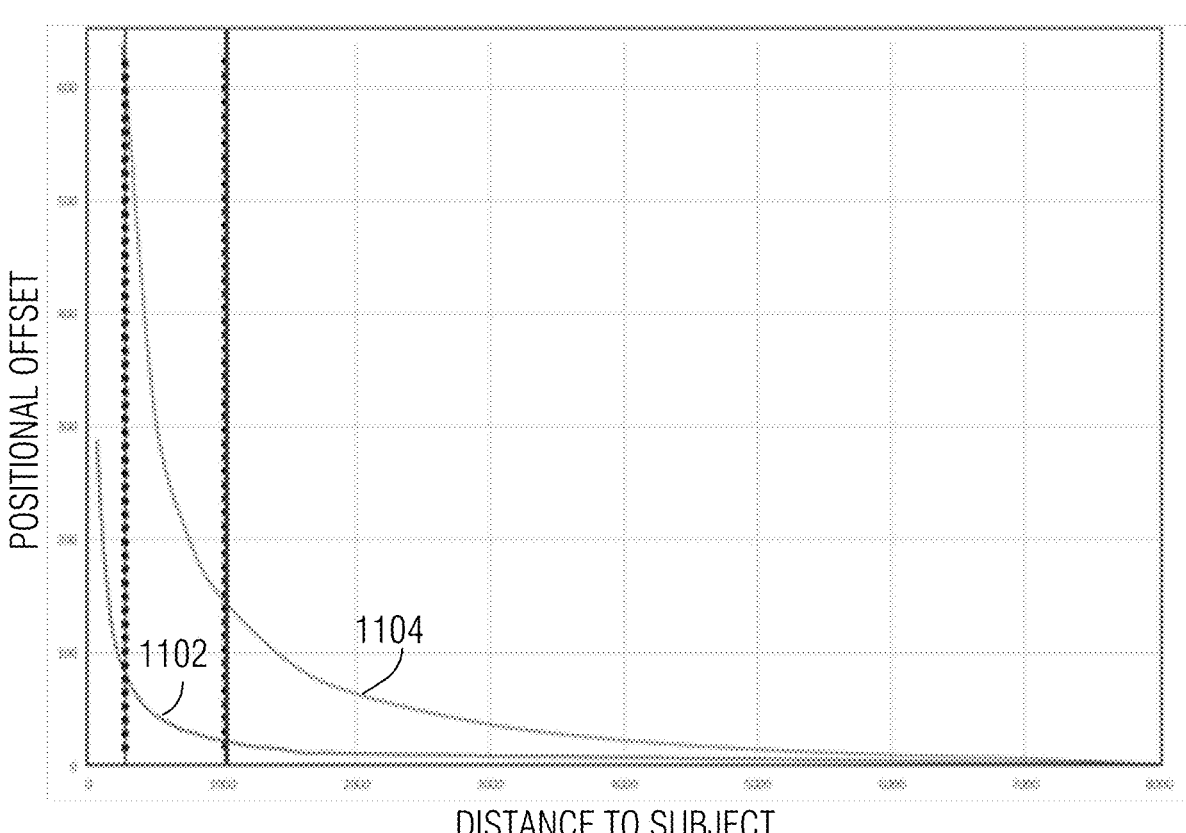
FIG. 11 is a graph illustrating an example of positional offsets of the aimer spot for a near-field image capture device and a far-field image capture device of an example scanning system.

FIG. 11 is a graph illustrating an example of positional offsets (in pixels) of the aimer spot for a near-field image capture device and a far-field image capture device of an example scanning system 100. As shown, curve 1102 corresponds to positional offset values of an aimer spot as captured by near-field image-capture device 102A, whereas curve 1104 corresponds to positional offset values of an aimer spot as captured by far-field image-capture device 102B. Therefore, at any given distance, the positional offsets are different as between the two types of image-capture devices.

Figure 12:
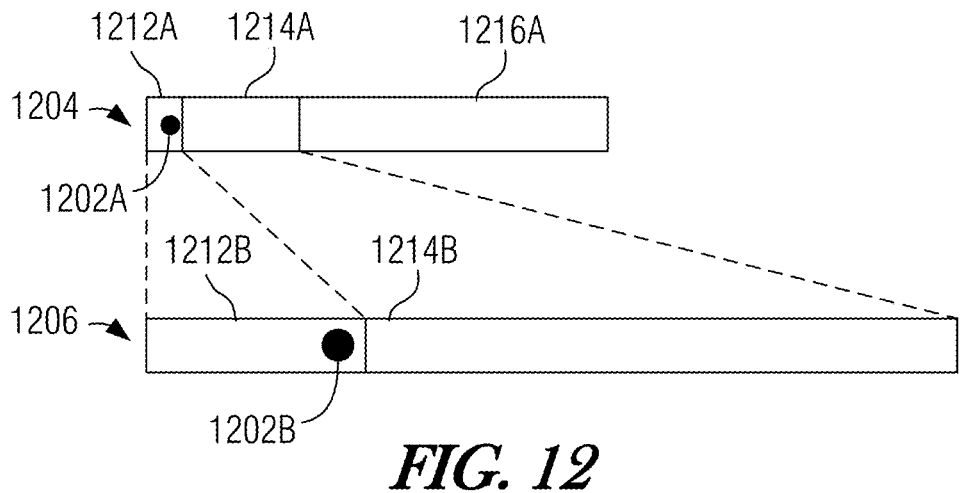
FIG. 12 is a diagram illustrating a pair of captured-image portions in which an aimer spot is shown, as captured respectively by a near-field image-capture device and a far-field image-capture device, according to an example.

FIG. 12 is a diagram illustrating a pair of captured-image portions 1204 and 1206 in which an aimer spot 1202A, 1202B is shown, as captured respectively by near-field image-capture device 102A and far-field image-capture device 102B, according to an example. Each captured-image portion 1204, 1206 may be divided into regions, as indicated at 1212A, 1214A, and 1216A for near-field image-capture device image portion 1204, and regions 1212B and 1214B for far-field image-capture device image portion 1206. Regions 1212A and 1212B correspond to ranging distances greater than 1 m in this example. Regions 1214A and 1214B correspond to ranging distances between 25 cm and 1 m in this example. Region 1216A corresponds to ranging distances less than 25 cm in this example and is therefore only visible in near-field image-capture device image 1204. Each region corresponds to a plausible aimer-spot offset amount according to various distances from the target surface. Based on the respective mechanical offsets from aimer projector 1212 and the respective fields of view, an aimer spot appearing in region 1212A of near-field image sensor image portion 1204 would be expected to appear in region 1212B of far-field image sensor image portion 1206, and vice-versa. Likewise, an aimer spot appearing in region 1214A of near-field image sensor image portion 1204 would be expected to appear in region 1214B of far-field image sensor image portion 1206, and vice-versa.

Referring again to FIG. 10, at 1006, the first aimer spot location corresponding to the first image-capture device and the second aimer spot location corresponding to the second image-capture device are compared against a predefined set of plausible values, such as those shown in FIG. 11 (which may be stored in controller 120), or against predefined regions, such as those shown in FIG. 12B (which may be stored in controller 120). If the offset values correspond to the predefined set of values or fall within expected regions, the aimer spot location is deemed plausible, and a distance to the target surface is computed based on the coordinates of the candidate aimer spot location at 1012. Otherwise, if the offset values fall outside of the applicable values or regions, the candidate aimer spot location is discarded at 1010. After either accepting as viable, or discarding, the candidate aimer spot location, the process repeats for the next candidate aimer spot if there is one or more candidate aimer spot to consider.

Computation of distance at 1012 may be performed based on the formula $D[mm]=a/(b*X[pixels]+c)+d$, where a, b, c, and d are calibrated constants determined empirically for scanning system 100 as part of the manufacturing process. Every camera has different constants based on mechanical offset with respect to the aimer and its field of view. An example of a method to match locations with a predefined set of values (e.g., as shown in FIG. 11) is to compute distance from the aimer spot location using the formula based on the calibrated constants of the camera used to capture such aimer spot. Aimer spots from different cameras are expected to match only if their calculated distance difference is below a predefined threshold.

Figure 13:
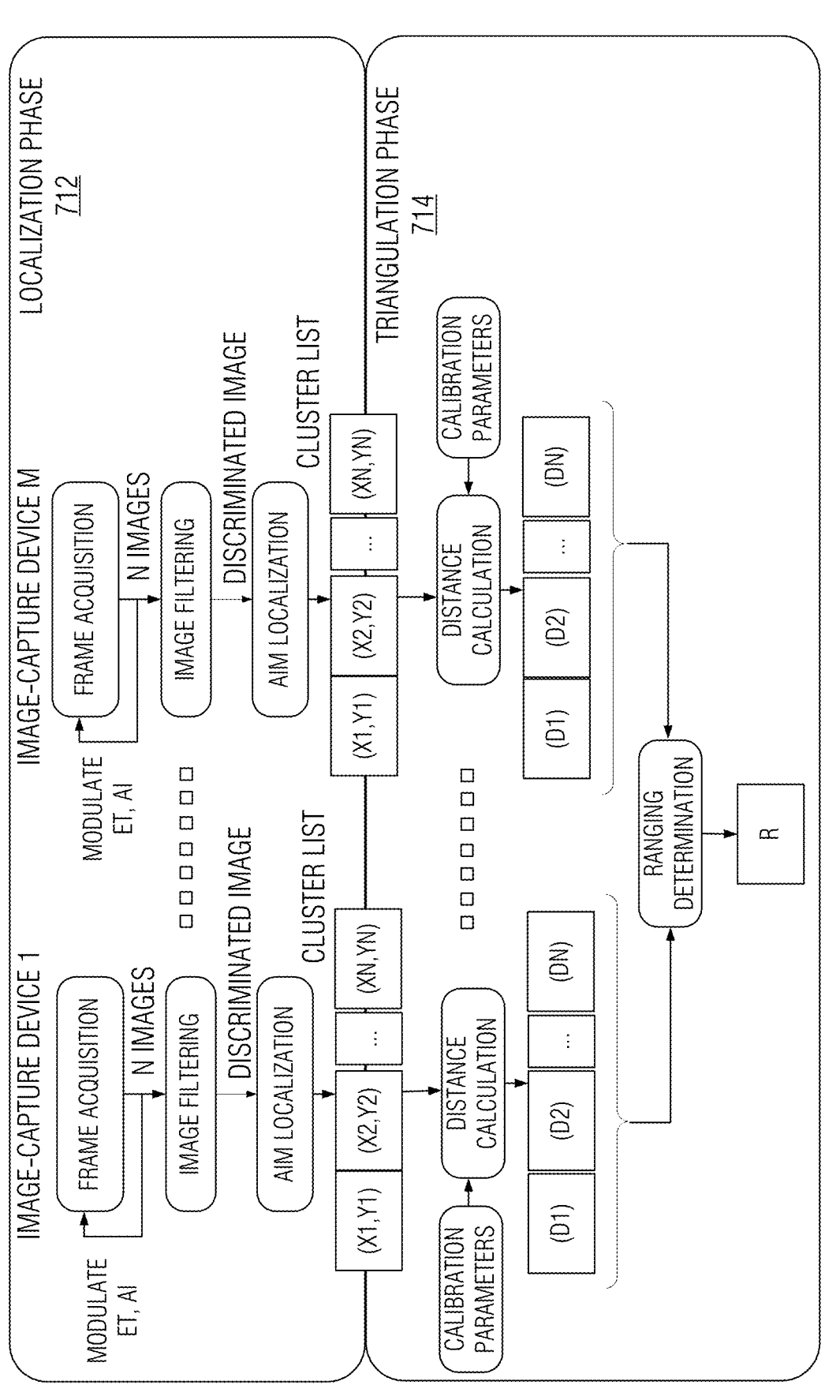
FIG. 13 is a diagram illustrating the functionality of an implementation of a localization phase and a triangulation phase according to a particular example.

FIG. 13 is a diagram illustrating the functionality of an implementation of localization phase 712 and triangulation phase 714 according to a particular example. In this example, the number of image-capture devices is generalized to M image capture devices. As shown, in localization phase 712, each image-capture device acquires image frames while the received aimer spot is modulated. Modulation can be achieved by varying the exposure time ET for the aimer spot, the aimer intensity (AI), or some combination of these. N image frames are captured and processed, where they may compared and filtered with thresholding, windowing, and decoding, where applicable, with optional additional filtering operations applied to reduce noise, movement artifacts, or the like. The result of this processing is a discriminated image frame in which the candidate aimer spot locations are discriminated from interfering sources. The location coordinates for each of these candidate aimer spot locations are placed in a cluster list, which is readable by triangulation phase 714.

In triangulation phase 714, each cluster list is processed to calculate the distance by triangulation, which produces a list of potential distances D1-DN, from which a most appropriate distance may be selected as the ranging determination R. Selection of the most appropriate ranging determination may involve cross-checking as discussed above, or other selection criteria.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents. For instance, in some embodiments, a single image-capture device may be used to accomplish localization and triangulation according to aspects of this disclosure.

In some embodiments, different exposures may be taken in parallel to improve the ambient light level working range and speed of the system (e.g., where fewer frames may be captured to find the aimer spot when the ambient light level is very high). In another type of variation, sensors dedicated to triangulation using, for example color sensors to find the aimer spot more easily, or filtered sensors to select only the aimer spot wavelength and filter all the other colors that are ambient noise, may be used.

In other various embodiments, controller 120 may incorporate a machine-learning system, such as a deep neural network—such as a convolutional neural network (CNN), for example, to perform at least some of the localization operations. For instance, a trained CNN may be used to efficiently identify candidate aimer spot locations from the series of image frames that are streaming in from the cameras in the system.

In various implementations, a CNN can receive the combined information from all the cameras, or multiple CNNs can each be specialized and dedicated to each of the cameras. The neural network may accept as its inputs the series of image frames coming from the multitude of cameras (2 or more) containing aimer spots, and the modulation pattern information of the aimer spot, and produce as its output a feature vector including the candidate aimer spot locations. In some implementations, the output may consist of one single aimer spot location determined to be the most correct localization result.

In related embodiments, a neural network may be fed with an optimized set of data preprocessed from the acquired images, so as to have a reduced amount of data to process and to have a neural network with an optimized size and complexity so that it can be easily integrated or implemented in a suitable embedded system. For example, a set of preprocessed data may have only a selected portion of the image, so as to limit the number of pixels to be processed. As another example, only compressed or simplified information on the pixel features of the region can be sent to the neural network instead of the pixel value, thus limiting the overall data to be processed so that a less complex and less deeply-trained convolutional neural network may be used to efficiently identify candidate aimer spot locations from the series of image frames.

In a related example, the output of the neural network may include the most probable detected distance as well as the position within the image of the detected most probable aimer spot, with the latter only discarding the noise. This output may provide the essential input for a triangulation engine that calculates the target distance as described above.

In another example, the neural network can be dedicated only to the spot localization phase, entirely leaving to other algorithms and engines the tasks of triangulating and selecting all the detected spots in the cluster list. The system may also include several neural networks, each of which is trained with a different data set. For example each of the neural networks can be solely dedicated to each of the cameras (if multiple cameras are used) in the system and trained accordingly. A similar approach implements a relatively simple CNN that runs on a computational platform with limited computational power, such as a standard embedded platform based on an Advanced RISC Machines (ARM) processor (e.g. Cortex A7 equipped with NEON or similar).

ADDITIONAL NOTES AND EXAMPLES

Example 1 is an apparatus of an optical scanner for scanning a subject, the apparatus comprising: interface circuitry including an input to receive a plurality of images from a at least one image-capture device; and controller circuitry coupled to the interface circuitry and the input, the circuitry operative to perform a ranging determination, the ranging determination including a localization phase and a triangulation phase, wherein: in the localization phase, a series of image frames is received via the input, the series of image frames collectively containing an aimer spot captured as a reflection off of a surface of the subject, the captured aimer spot being temporally modulated according to a modulation pattern, and the series of image frames is processed to discriminate the aimer spot based on the modulation pattern to determine a probable location of the aimer spot within at least one of the image frames of the series; and in the triangulation phase, the probable location of the aimer spot is processed to produce the ranging determination, wherein the ranging determination represents a distance between the at least one image-capture device and the surface of the subject.

In Example 2, the subject matter of Example 1 includes, wherein the interface circuitry further includes an input to receive an activation signal, and wherein the controller is to perform the ranging determination in response to the activation signal.

In Example 3, the subject matter of Examples 1-2 includes, wherein the interface circuit is to receive a plurality of images from each of a plurality of image-capture devices.

In Example 4, the subject matter of Example 3 includes, wherein the plurality of image-capture devices includes a near-field camera and a far-field camera, wherein the far-field camera has a narrower field of view than the near-field camera.

In Example 5, the subject matter of Examples 3-4 includes, wherein in the plurality of images from each of the plurality of image-capture devices has device-specific a positional offset of the captured aimer spot that varies based on a distance between a respective image-capture device and the surface of the subject, and further based on a relative position of that respective image-capture device and a projector of the aimer spot; and wherein in the triangulation phase the probable location of the aimer spot is processed to assess whether that probable location is within a plausible location based on different device-specific positional offsets in image frames captured by different ones of the plurality of image-capture devices.

In Example 6, the subject matter of Examples 1-5 includes, wherein the interface circuitry includes an aimer output to control an aimer spot projector that is operative to produce an aimer emission that causes the aimer spot.

In Example 7, the subject matter of Examples 1-6 includes, wherein the controller circuitry is operative to produce a modulation control signal based on the modulation pattern, and the aimer output is operative to couple the modulation control signal to the aimer spot projector.

In Example 8, the subject matter of Examples 1-7 includes, wherein the controller circuitry is operative to determine an autofocus setting based on the ranging determination, and wherein the interface circuitry includes a focus control output coupled to the controller circuitry, and to an optical system of the at least one image-capture device to communicate the autofocus setting from the controller circuitry to the optical system.

In Example 9, the subject matter of Examples 1-8 includes, wherein the captured aimer spot is temporally modulated by on-off switching.

In Example 10, the subject matter of Example 9 includes, wherein the captured aimer spot is temporally modulated by duty-cycle variation.

In Example 11, the subject matter of Examples 9-10 includes, wherein the captured aimer spot is temporally modulated by pulse-position variation.

In Example 12, the subject matter of Examples 1-11 includes, wherein the modulation pattern includes encoded information.

In Example 13, the subject matter of Examples 1-12 includes, wherein the captured aimer spot is temporally modulated by intensity variation of the aimer spot.

In Example 14, the subject matter of Examples 1-13 includes, wherein in the localization phase, the controller is operative to cause variation of an image-capture parameter to vary sensitivity of the at least one image-capture device.

In Example 15, the subject matter of Examples 1-14 includes, wherein the captured aimer spot is temporally modulated by variation of alignment of aimer spot transmission with image frame capture of the at least one image-capture device.

In Example 16, the subject matter of Examples 1-15 includes, wherein in the localization phase, the series of image frames is processed to discriminate the aimer spot based on the modulation pattern by computing a pixel-wise difference between successive image frames of the series of image frames to reveal a difference caused by the temporal modulation of the aimer spot at a location within the image frames corresponding to the aimer spot.

In Example 17, the subject matter of Example 16 includes, wherein the difference is determined over the series of image frames, and wherein the difference varies in accordance with the modulation pattern.

In Example 18, the subject matter of Examples 16-17 includes, wherein a filtering operation is applied to the difference to filter out portions of the series of image frames that fail to meet a difference threshold.

Example 19 is a method for operating an optical scanner for scanning a subject, the method comprising: autonomously receiving a plurality of images from a at least one image-capture device; and autonomously performing a ranging determination, the ranging determination including a localization phase and a triangulation phase, wherein: in the localization phase, a series of image frames is received, the series of image frames collectively containing an aimer spot captured as a reflection off of a surface of the subject, the captured aimer spot being temporally modulated according to a modulation pattern, and the series of image frames is processed to discriminate the aimer spot based on the modulation pattern to determine a probable location of the aimer spot within at least one of the image frames of the series; and in the triangulation phase, the probable location of the aimer spot is processed to produce the ranging determination, wherein the ranging determination represents a distance between the at least one image-capture device and the surface of the subject.

In Example 20, the subject matter of Example 19 includes, receiving an activation signal, and performing the ranging determination in response to the activation signal.

In Example 21, the subject matter of Examples 19-20 includes, receiving a plurality of images from each of a plurality of image-capture devices.

In Example 22, the subject matter of Example 21 includes, wherein the plurality of image-capture devices includes a near-field camera and a far-field camera, wherein the far-field camera has a narrower field of view than the near-field camera.

In Example 23, the subject matter of Examples 21-22 includes, wherein in the plurality of images from each of the plurality of image-capture devices has device-specific a positional offset of the captured aimer spot that varies based on a distance between a respective image-capture device and the surface of the subject, and further based on a relative position of that respective image-capture device and a projector of the aimer spot; and wherein in the triangulation phase the probable location of the aimer spot is processed to assess whether that probable location is within a plausible location based on different device-specific positional offsets in image frames captured by different ones of the plurality of image-capture devices.

In Example 24, the subject matter of Examples 19-23 includes, controlling an aimer spot projector that is operative to produce an aimer emission that causes the aimer spot.

In Example 25, the subject matter of Examples 19-24 includes, producing a modulation control signal based on the modulation pattern, and feeding the modulation control signal to the aimer spot projector.

In Example 26, the subject matter of Examples 19-25 includes, autonomously determining an autofocus setting based on the ranging determination, and communicating the autofocus setting to an optical system of the at least one image-capture device.

In Example 27, the subject matter of Examples 19-26 includes, wherein the captured aimer spot is temporally modulated by on-off switching.

In Example 28, the subject matter of Example 27 includes, wherein the captured aimer spot is temporally modulated by duty-cycle variation.

In Example 29, the subject matter of Examples 27-28 includes, wherein the captured aimer spot is temporally modulated by pulse-position variation.

In Example 30, the subject matter of Examples 19-29 includes, wherein the modulation pattern includes encoded information.

In Example 31, the subject matter of Examples 19-30 includes, wherein the captured aimer spot is temporally modulated by intensity variation of the aimer spot.

In Example 32, the subject matter of Examples 19-31 includes, varying an image-capture parameter to vary sensitivity of the at least one image-capture device.

In Example 33, the subject matter of Examples 19-32 includes, wherein the captured aimer spot is temporally modulated by variation of alignment of aimer spot transmission with image frame capture of the at least one image-capture device.

In Example 34, the subject matter of Examples 19-33 includes, wherein in the localization phase, the series of image frames is processed to discriminate the aimer spot based on the modulation pattern by computing a pixel-wise difference between successive image frames of the series of image frames to reveal a difference caused by the temporal modulation of the aimer spot at a location within the image frames corresponding to the aimer spot.

In Example 35, the subject matter of Example 34 includes, wherein the difference is determined over the series of image frames, and wherein the difference varies in accordance with the modulation pattern.

In Example 36, the subject matter of Examples 34-35 includes, performing a filtering operation to the difference to filter out portions of the series of image frames that fail to meet a difference threshold.

Example 37 is an apparatus of an optical scanner for scanning a subject, the apparatus comprising: interface circuitry including an input to receive a plurality of images from a plurality of image-capture devices; and controller circuitry coupled to the interface circuitry and the input, the controller circuitry operative to perform a ranging determination, the ranging determination including a localization phase and a triangulation phase, wherein: each image of the plurality of images from each of the plurality of image-capture devices has a device-specific positional offset of the captured aimer spot that varies based on a distance between a respective image-capture device and the surface of the subject, and further based on a relative position of that respective image-capture device and a projector of the aimer spot; the localization phase identifies a probable location of the aimer spot within the captured image frames; and in the triangulation phase the probable location of the aimer spot is processed to assess whether that probable location of the aimer spot is within a plausible location based on different device-specific positional offsets in image frames captured by different ones of the plurality of image-capture devices; wherein the ranging determination represents a distance between the at least one image-capture device and the surface of the subject.

In Example 38, the subject matter of Example 37 includes, wherein the first image-capture device is associated with a first set of positional offsets of the captured aimer spot that is a function of distance of the first image-capture device and the surface of the subject, and wherein the second image-capture device is associated with a second set of positional offsets of the captured aimer spot that is a function of distance of the second image-capture device and the surface of the subject.

In Example 39, the subject matter of Example 38 includes, wherein the first set of positional offsets is stored in the controller circuitry, and wherein the second set of positional offsets is stored in the controller circuitry; and wherein the controller circuitry is operative to compute the assessment of whether the probable location of the aimer spot is within a plausible location based on: a determination of a first distance according to the first set of positional offsets based on a first positional offset of the probable location of the aimer spot in a first image captured by the first image-capture device; and a comparison of (a) an expected second positional offset value corresponding to the first distance according to the second set of positional offsets and (b) a second positional offset of the probable location of the aimer spot in a second image captured by the second image-capture device.

In Example 40, the subject matter of Examples 38-39 includes, wherein the first set of positional offsets is stored in the controller circuitry, and wherein the second set of positional offsets is stored in the controller circuitry; and wherein the controller circuitry is operative to compute the assessment of whether the probable location of the aimer spot is within a plausible location based on: a determination of a first distance according to the first set of positional offsets based on a first positional offset of the probable location of the aimer spot in a first image captured by the first image-capture device; and a determination of a second distance according to the second set of positional offsets based on a second positional offset of the probable location of the aimer spot in a second image captured by the second image-capture device; and a comparison of the first distance and the second distance.

In Example 41, the subject matter of Examples 38-40 includes, wherein the first set of positional offsets is stored in the controller circuitry a first set of offset regions corresponding to different ranges of distances between the first image-capture device and the surface of the subject, and wherein the second set of positional offsets is stored in the controller circuitry a second set of offset regions corresponding to different ranges of distances between the second image-capture device and the surface of the subject, wherein certain offset regions of the first set correspond with certain offset regions of the second set according to correspondence criteria.

In Example 42, the subject matter of Example 41 includes, wherein the controller circuitry is operative to compute the assessment of whether the probable location of the aimer spot is within a plausible location based on: a determination of a first offset region of the first set that corresponds to a first positional offset of the probable location of the aimer spot in a first image captured by the first image-capture device; a determination of a second offset region of the second set that corresponds to a second positional offset of the probable location of the aimer spot in a second image captured by the second image-capture device; and an assessment of whether the first offset region and the second offset region are corresponding offset regions based on the correspondence criteria.

In Example 43, the subject matter of Examples 38-42 includes, wherein the first image-capture device has a first field of view and the second image-capture device has a second field of view that is different from the first field of view.

Example 44 is at least one machine-readable medium including instructions that, when executed by processing circuitry, cause the processing circuitry to perform operations to implement of any of Examples 1-43.

Example 45 is an apparatus comprising means to implement of any of Examples 1-43.

Example 46 is a system to implement of any of Examples 1-43.

Example 47 is a method to implement of any of Examples 1-43.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An apparatus of an optical scanner for scanning a subject, the apparatus comprising:

interface circuitry including an input to receive a plurality of images from at least one image-capture device; and controller circuitry coupled to the interface circuitry and the input, the controller circuitry operative to perform a ranging determination, the ranging determination including a localization phase and a triangulation phase, wherein:

in the localization phase:

project an aimer spot onto a subject;

receive a series of image frames via the input, the series of image frames collectively containing an aimer spot captured as a reflection off of a surface of the subject;

temporally modulate the aimer spot and an exposure of the at least one image-capture device according to a modulation pattern such that appearance of the aimer spot and ambient lighting each differs among image frames of the series, and wherein a captured intensity of the aimer spot is varied among the image frames in inverse relation to a captured exposure level of those image frames; and process the series of image frames to discriminate the aimer spot from other light sources based on the modulation pattern to determine a probable location of the aimer spot within at least one of the image frames of the series; and in the triangulation phase:

process the probable location of the aimer spot to produce the ranging determination based on evaluation of the aimer spot differing among the series of image frames according to the modulation pattern, wherein the ranging determination represents a distance between the at least one image-capture device and the surface of the subject.

2. The apparatus of claim 1, wherein the interface circuitry further includes an input to receive an activation signal, and wherein the controller is operative to perform the ranging determination in response to the activation signal.

3. The apparatus of claim 1, wherein the interface circuit is operative to receive a plurality of images from each of a plurality of image-capture devices.

4. The apparatus of claim 3, wherein the plurality of image-capture devices includes a near-field camera and a far-field camera, wherein the far-field camera has a narrower field of view than the near-field camera.

5. The apparatus of claim 3, wherein in the plurality of images from each of the plurality of image-capture devices has a device-specific positional offset of the captured aimer spot that varies based on a distance between a respective image-capture device and the surface of the subject, and further based on a relative position of that respective image-capture device and a projector of the aimer spot; and wherein in the triangulation phase the probable location of the aimer spot is processed to assess whether that probable location is within a plausible location based on different device-specific positional offsets in image frames captured by different ones of the plurality of image-capture devices.

6. The apparatus of claim 1, wherein:

the interface circuitry includes an aimer output to control an aimer spot projector that is operative to produce an aimer emission that causes the aimer spot; and the controller circuitry is operative to produce a modulation control signal based on the modulation pattern, and the aimer output is operative to couple the modulation control signal to the aimer spot projector.

7. The apparatus of claim 1, wherein the aimer spot is temporally modulated by intensity variation of the aimer spot.

8. The apparatus of claim 1, wherein in the localization phase, the controller is operative to cause variation of image-capture parameters of the at least one image-capture device.

9. The apparatus of claim 1, wherein the aimer spot is temporally modulated by variation of duration of aimer spot projection relative to a duration of an exposure of the at least one image-capture device for image frame capture.

10. The apparatus of claim 1, wherein in the localization phase, the series of image frames is processed to discriminate the aimer spot based on the modulation pattern by computing a pixel-wise comparison operation between successive image frames of the series of image frames to reveal a variation caused by the temporal modulation of the aimer spot at a location within the image frames corresponding to the aimer spot.

11. The apparatus of claim 10, wherein:

the comparison operation is determined over the series of image frames, and wherein the comparison operation varies in accordance with the modulation pattern; and a filtering operation is applied to the comparison operation to filter out portions of the series of image frames that fail to meet a defined threshold.

12. An apparatus of an optical scanner for scanning a subject, the apparatus comprising:

an aimer projector operative to project an aimer spot onto a subject such that the aimer spot is temporally modulated as it is projected according to a modulation pattern;

interface circuitry including an input to receive a plurality of images of varying exposure level from a plurality of image-capture devices collectively containing the aimer spot captured as a reflection off of a surface of the subject and such that an appearance of the aimer spot differs among image frames of the series, wherein the modulation pattern of the aimer spot produces a captured intensity of the aimer spot that is varied among the images in inverse relation to the exposure levels of those images; and controller circuitry coupled to the aimer projector, the interface circuitry and the input, the controller circuitry operative to perform a ranging determination, the ranging determination including a localization phase and a triangulation phase, wherein:

each image of the plurality of images from each of the plurality of image-capture devices has a device-specific positional offset of the captured aimer spot that varies based on a distance between a respective image-capture device and the surface of the subject, and further based on a relative position of that respective image-capture device and a projector of the aimer spot;

the localization phase identifies a probable location of the aimer spot in a series of image frames that is received via the input based on an evaluation of the aimer spot differing among the series of image frames according to the modulation pattern and the varied exposure levels to determine the probable location of the aimer spot within at least one of the image frames of the series; and in the triangulation phase the probable location of the aimer spot is processed to assess whether that probable location of the aimer spot is within a plausible location based on different device-specific positional offsets in image frames captured by different ones of the plurality of image-capture devices;

wherein the ranging determination represents a distance between the optical scanner and the surface of the subject.

13. The apparatus of claim 12, wherein a first image-capture device of the plurality of image-capture devices is associated with a first set of positional offsets of the captured aimer spot that is a function of distance of the first image-capture device and the surface of the subject, and wherein a second image-capture device of the plurality of image-capture devices is associated with a second set of positional offsets of the captured aimer spot that is a function of distance of the optical scanner and the surface of the subject.

14. The apparatus of claim 13, wherein the first set of positional offsets is stored in the controller circuitry, and wherein the second set of positional offsets is stored in the controller circuitry; and wherein the controller circuitry is operative to compute the assessment of whether the probable location of the aimer spot is within a plausible location based on:

a determination of a first distance according to the first set of positional offsets based on a first positional offset of the probable location of the aimer spot in a first image captured by the first image-capture device; and a comparison of (a) an expected second positional offset value corresponding to the first distance according to the second set of positional offsets and (b) a second positional offset of the probable location of the aimer spot in a second image captured by the second image-capture device.

15. The apparatus of claim 13, wherein the first set of positional offsets is stored in the controller circuitry, and wherein the second set of positional offsets is stored in the controller circuitry; and wherein the controller circuitry is operative to compute the assessment of whether the probable location of the aimer spot is within a plausible location based on:

a determination of a first distance according to the first set of positional offsets based on a first positional offset of the probable location of the aimer spot in a first image captured by the first image-capture device; and a determination of a second distance according to the second set of positional offsets based on a second positional offset of the probable location of the aimer spot in a second image captured by the second image-capture device; and a comparison of the first distance and the second distance.

16. The apparatus of claim 13, wherein the first set of positional offsets is stored in the controller circuitry a first set of offset regions corresponding to different ranges of distances between the first image-capture device and the surface of the subject, and wherein the second set of positional offsets is stored in the controller circuitry a second set of offset regions corresponding to different ranges of distances between the second image-capture device and the surface of the subject, wherein certain offset regions of the first set correspond with certain offset regions of the second set according to correspondence criteria.

17. The apparatus of claim 16, wherein the controller circuitry is operative to compute the assessment of whether the probable location of the aimer spot is within a plausible location based on:

a determination of a first offset region of the first set that corresponds to a first positional offset of the probable location of the aimer spot in a first image captured by the first image-capture device;

a determination of a second offset region of the second set that corresponds to a second positional offset of the probable location of the aimer spot in a second image captured by the second image-capture device; and an assessment of whether the first offset region and the second offset region are corresponding offset regions based on the correspondence criteria.

18. A method for operating an optical scanner for scanning a subject, the method comprising:

projecting an aimer spot onto a target;

autonomously receiving a plurality of images from at least one image-capture device, the plurality of images having been captured at varying exposure levels; and autonomously performing a ranging determination, the ranging determination including a localization phase and a triangulation phase, wherein:

in the localization phase, the aimer spot is temporally modulated as it is projected according to a modulation pattern, a series of image frames is received, the series of image frames collectively containing the aimer spot captured as a reflection off of a surface of the subject such that an intensity of the captured aimer spot differs among image frames of the series according to the modulation pattern, the modulation pattern being in inverse relation to the exposure levels of the captured image frames, and the series of image frames is processed to discriminate the aimer spot from other light sources based on the modulation pattern and the exposure levels to determine a probable location of the aimer spot within at least one of the image frames of the series; and in the triangulation phase, the probable location of the aimer spot is processed to produce the ranging determination based on evaluation of the aimer spot differing among the series of image frames according to the modulation pattern, wherein the ranging determination represents a distance between the at least one image-capture device and the surface of the subject.

19. The method of claim 18, further comprising:

receiving a plurality of images from each of a plurality of image-capture devices, wherein in the plurality of images from each of the plurality of image-capture devices has device-specific a positional offset of the captured aimer spot that varies based on a distance between a respective image-capture device and the surface of the subject, and further based on a relative position of that respective image-capture device and a projector of the aimer spot; and wherein in the triangulation phase the probable location of the aimer spot is processed to assess whether that probable location is within a plausible location based on different device-specific positional offsets in image frames captured by different ones of the plurality of image-capture devices.

20. The method of claim 18, wherein in the localization phase, the series of image frames is processed to discriminate the aimer spot based on the modulation pattern by computing a pixel-wise difference between successive image frames of the series of image frames to reveal a difference caused by the temporal modulation of the aimer spot at a location within the image frames corresponding to the aimer spot.

* * * * *